July 7, 1964 E. P. VIRTUE ETAL 3,140,103
THREE-POINT IMPLEMENT ATTACHING HITCH MECHANISM
Original Filed Oct. 28, 1960 5 Sheets-Sheet 2

INVENTORS
EUGENE P. VIRTUE
DONALD W. MOYER
PIERCE F. RICHARDSON
Paul O. Pippel
ATTORNEY

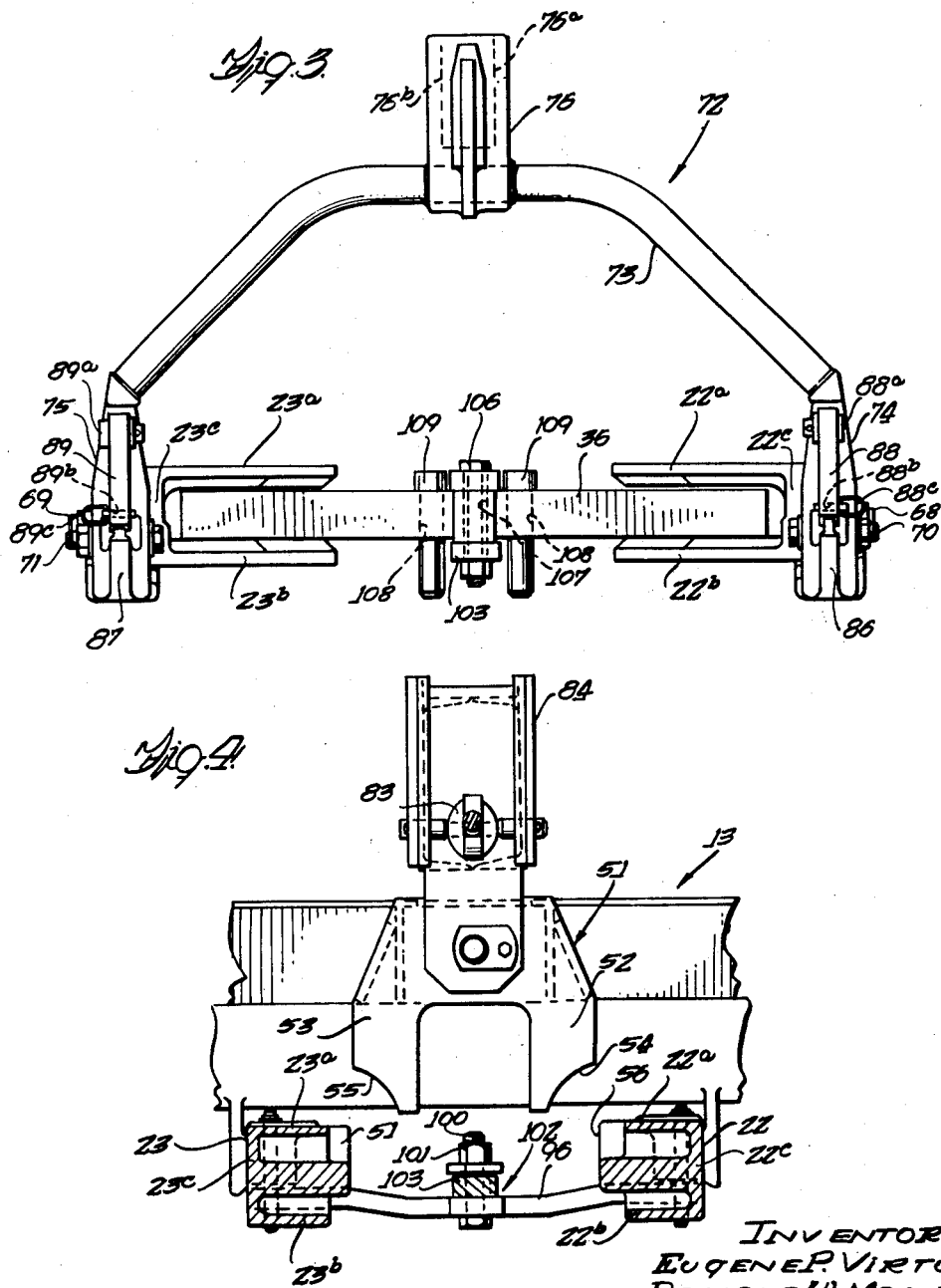

Fig. 5.

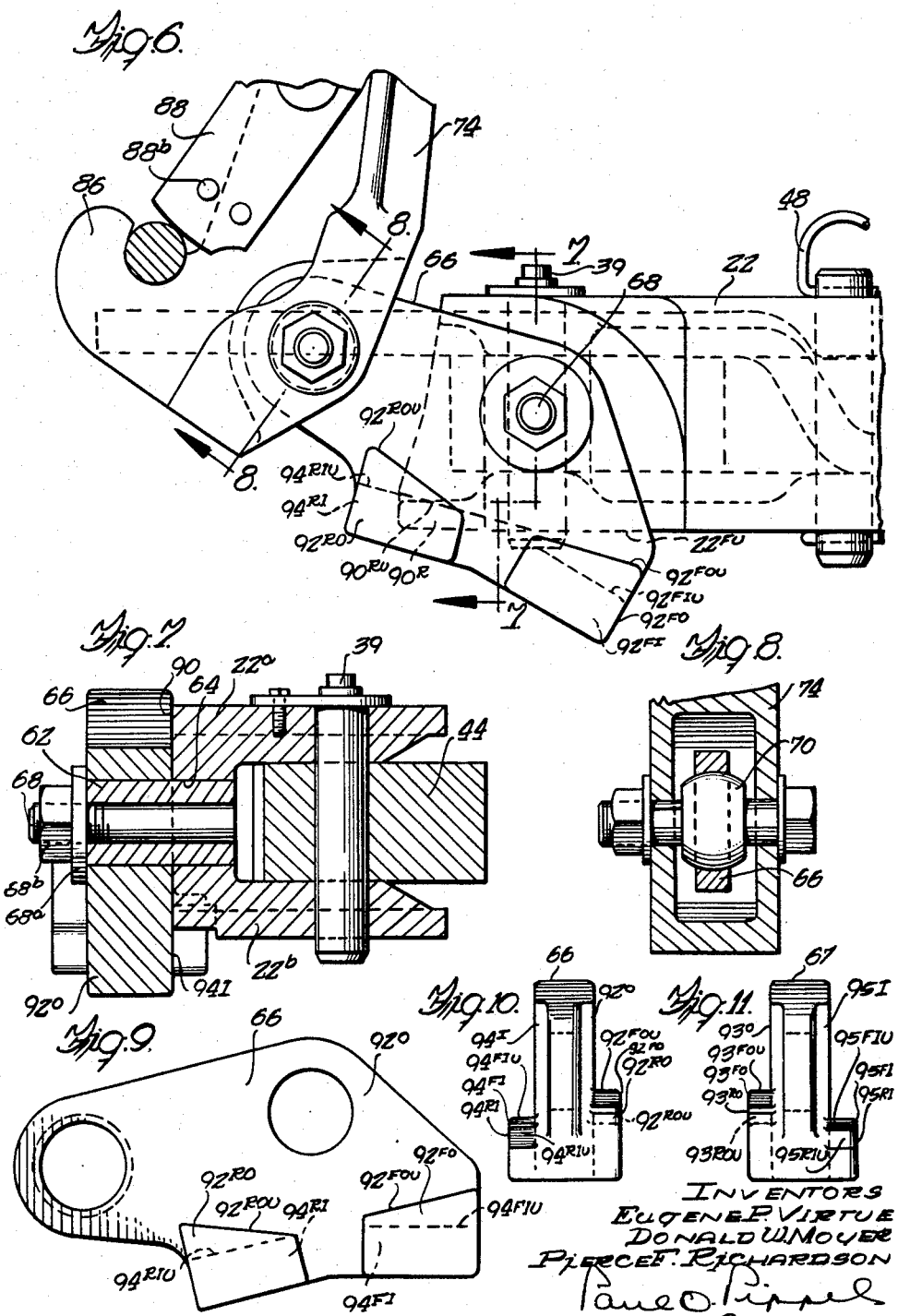

United States Patent Office 3,140,103
Patented July 7, 1964

3,140,103
THREE-POINT IMPLEMENT ATTACHING
HITCH MECHANISM
Eugene P. Virtue, Tinley Park, Donald W. Moyer, Chicago, and Pierce F. Richardson, Hinsdale, Ill., assignors to International Harvester Company, Chicago, Ill., a corporation of New Jersey
Original application Oct. 28, 1960, Ser. No. 65,704, now Patent No. 3,065,977, dated Nov. 27, 1962. Divided and this application June 20, 1961, Ser. No. 118,300
7 Claims. (Cl. 280—462)

This invention relates to earth-working equipment, but more particularly it is directed to earth-working implement-attaching apparatus for supportably and detachably fastening an implement of this character to a propelling vehicle such as a tractor. More specifically, though, it is concerned with attaching an implement of the three-point type to a vehicle.

The present application is a division of our copending application Serial No. 65,704 filed October 28, 1960, now Patent No. 3,065,977, for a Three-Point Implement Attaching Hitch Mechanism.

Heretofore, a great variety of such mechanisms have been produced and thereafter commercially marketed and it is to an improved form of such apparatus that the present invention is directed. It is an important object of the present invention, therefore, to provide an improved, flexible, highly adaptable and well stabilized hitch mechanism of the three-point type for supportably attaching an earth-working implement to a vehicle, and wherein a longitudinally extending swingable drawbar or towbar member is entirely carried by said hitch mechanism for vertical movement therewith.

Another important object is to provide an implement-attaching hitch mechanism arranged so as to selectively permit a limited amount of lateral sway or to restrict lateral sway completely of the mechanism in various operating positions of said mechanism.

Another object is to provide an implement-attaching hitch mechanism that will selectively permit a limited amount of float or will completely restrict float in a vertical direction of the implement-attaching connecting portions of the mechanism without effecting actuation of power lift means associated therewith.

A further object is to provide an implement-attaching hitch mechanism of the three-point type that utilizes a pair of independently actuatable hydraulic power lift means for raising and lowering said hitch mechanism without having to provide rockshaft means interconnecting said separate lift means for assuring simultaneous coordinated movements of said separate lift means.

A still further object is to provide an implement-attaching hitch mechanism fashioned to constitute a frame universally pivotally connected at the forward end thereof to a vehicle, and wherein pivotally interconnecting means at the corners of the rearward end of the frame are fastenable with laterally spaced-apart arms of the frame so as to interlock said arms whereby each of the arms thereof will be raised and lowered equal amounts in simultaneous movements when the hitch mechanism is moved as a result of the respective expansion and contraction movements of a pair of independently operable hydraulic rams associated therewith.

A more general object is to provide an implement-attaching hitch mechanism comprising a pair of laterally spaced-apart arms pivotally mounted on the vehicle at their forward or inboard ends and interlockable for simultaneous movement at their rearward or outboard ends, and wherein said rearward ends of the arms are each provided with an extension member mountable thereon so as to be selectively positionable to move with the respective arms as an extension thereof or to be independently pivotable a limited amount in a vertical plane relative to said respective arms.

The foregoing and other objects and features of the invention will become apparent as the disclosure is more fully made in the following detailed description of a preferred embodiment of the invention as illustrated in the accompanying sheets of drawings in which:

FIGURE 3 is an end elevational view of the proposed hitch mechanism only, the vehicle being omitted in this view;

FIGURE 4 is a fragmentary vertical sectional view taken along the line 4—4 of FIGURE 1;

FIGURE 5 is a horizontal sectional view taken generally along the line 5—5 of FIGURE 1;

FIGURE 6 is a fragmentary elevational view (in enlarged dimension), somewhat similar to FIGURE 1, but showing the float linkage connection raised to the top of its float position;

FIGURE 7 is a fragmentary vertical sectional view taken along the line 7—7 of FIGURE 6;

FIGURE 8 is a fragmentary vertical sectional view taken along the line 8—8 of FIGURE 6;

FIGURE 9 is an elevational view of the right hand (as viewed in FIGS. 2 and 3) intermediate or extension link member;

FIGURE 10 is an end elevational view of the right hand extension link shown in the preceding view; and FIGURE 11 is an end elevational view of the left hand intermediate link.

Figure 1:
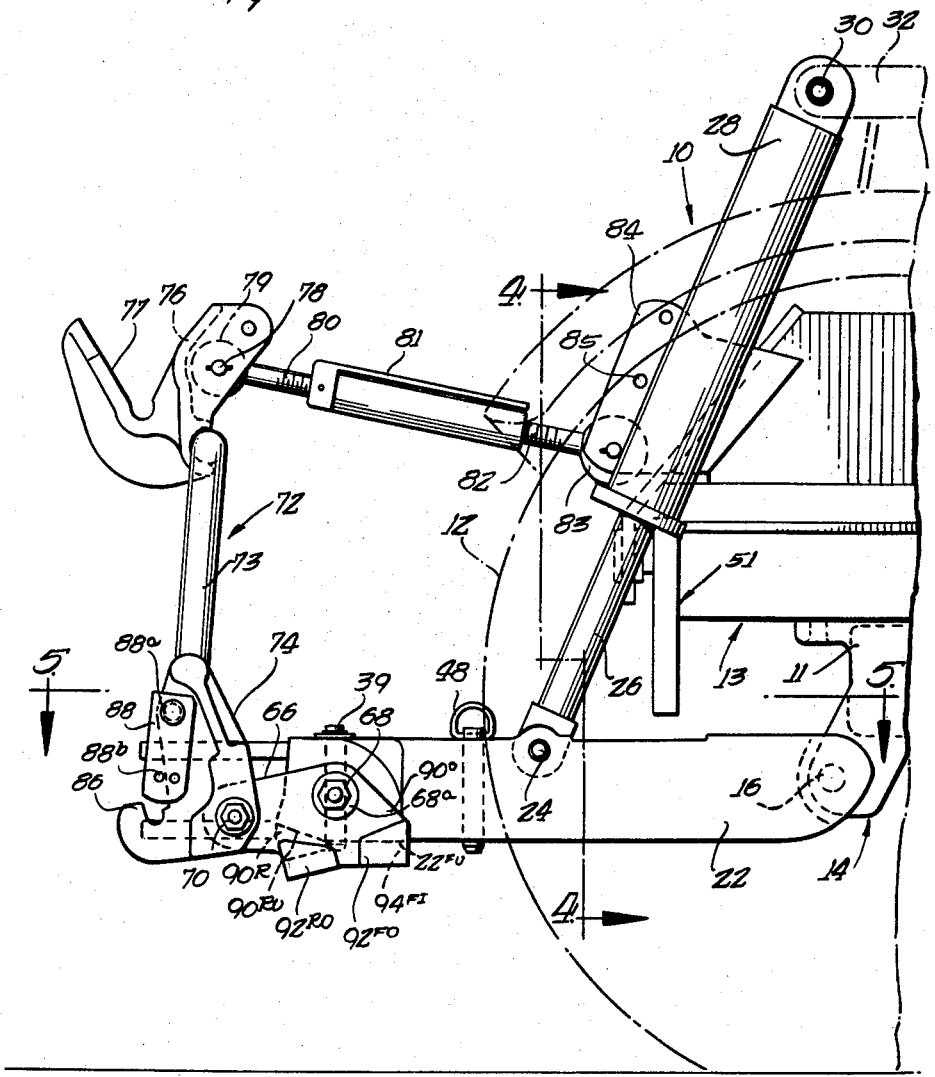
FIGURE 1 is an elevational view of the proposed hitch mechanism shown as incorporated on a tractor vehicle the latter of which is only fragmentarily represented.
Figure 2:
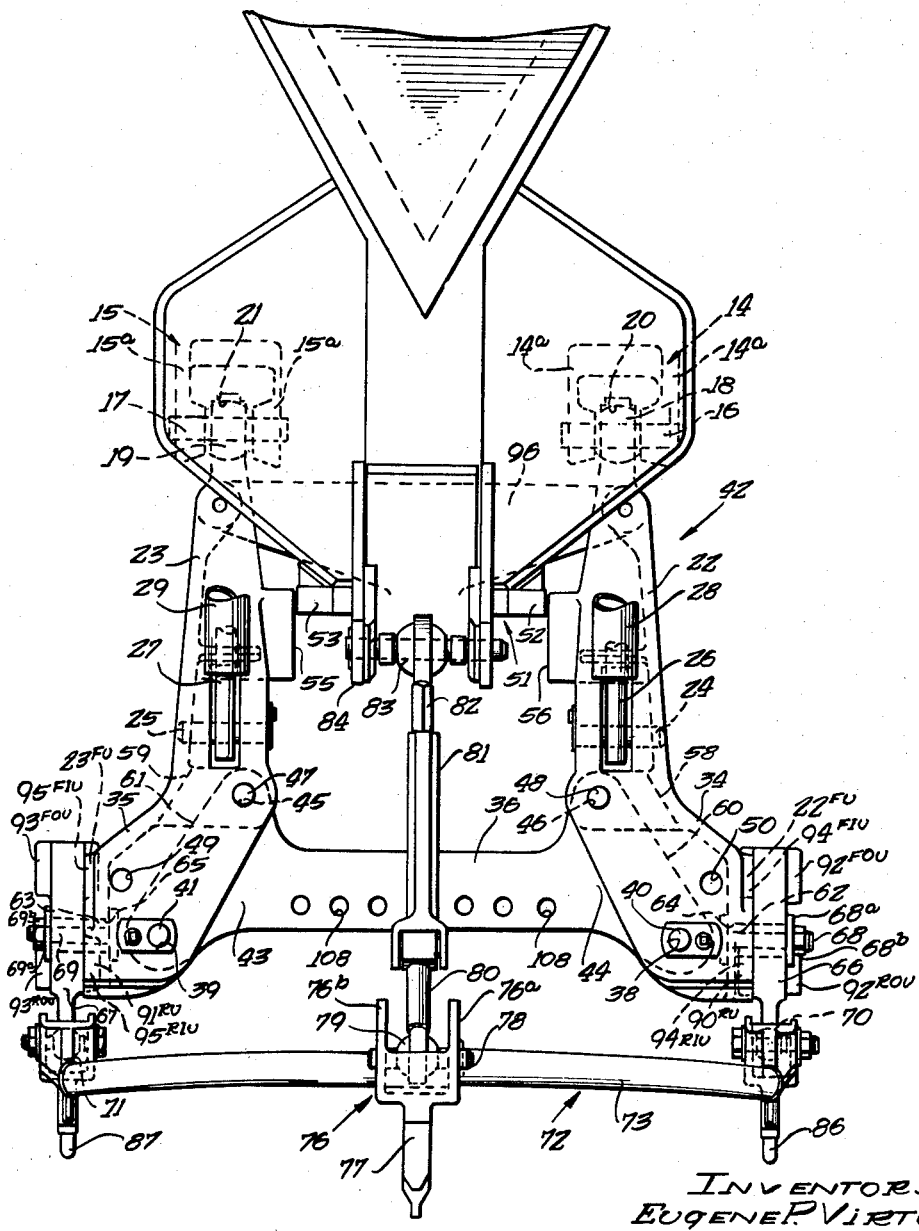
FIGURE 2 is a top plan view, with certain components thereof shown only fragmentarily, of the hitch device depicted in FIGURE 1.

The proposed invention is shown, in one preferred embodiment thereof, as incorporated in a tractor vehicle, but since the vehicle forms no particular part of the invention hereof the vehicle is shown only fragmentarily in the attached drawings. The vehicle may be of any well known construction which includes a suitable frame or chassis, such as indicated at 10, which, in turn, includes as a usual component thereof a rear axle housing structure 11 which supportably mounts a pair of laterally spaced-apart traction wheels 12, only one of which is shown. A cradle member, indicated generally at 13, may be used for pivotally interconnecting the axle structure and the chassis or frame of the vehicle but since a full disclosure of the structural details thereof is not essential to a comprehensive understanding of the present invention these details are not shown or described herein.

Depending from the axle structure portion 11 of the frame 10 and suitably fixedly secured thereto are a pair of laterally spaced-apart brackets 14 and 15. Each of the brackets may be fashioned with a pair of laterally spaced arms 14a, 14a and 15a, 15a that pivotally mount therein the pins 16, 17 for supporting spherical-shaped ball members 18, 19 that, in turn, are mounted in spherical-shaped sockets 20, 21 in the forward end of lower draft links or hitch arm members 22, 23. Each such draft link or hitch arm member may be fashioned as a channel-like member having upper and lower horizontally extending legs 22a 22b and 23a, 23b, respectively, interconnected by a vertical web or wall 22c, 23c, so that in cross-section each link resembles an overturned U-shape with the open mouth of the channel thereof facing inwardly toward the longitudinally extending central axis of the vehicle. Pins 24, 25, respectively, mounted in each draft line or hitch arm supportably and pivotally mount the free ends of piston rods or drop links 26, 27 forming part of the expandable and contractable hydraulic rams, indicated generally at 28, 29, and the opposite ends of said rams are supported and pivotally mounted by pins 30 (only one of which is shown) on brackets 32 (only one shown), in turn, suitably affixed to the vehicle frame 10. It will be understood, of course, that a suitable source of hydraulic pressure will be provided to operate said rams and that such will be supplemented by a conventional control valve and interconnected hydraulic system, but since these elements form no particular part of the structure of the present invention the details thereof have been omitted from this description.

The rearward or outboard end portion of each hitch arm bends or flairs outwardly as indicated at 34, 35, and these end portions are interconnected by a transverse horizontally extending drawbar member shown generally at 36. The vertical dimension of the drawbar is selected to permit each end of said drawbar member to be freely positioned in the open mouth of the channel formed in a respective hitch arm 22, 23. Aligned apertures 38, 39, in the respective hitch arms and in the proximate end portions of said drawbar, are adapted to receive pins such as 40, 41 for pivotally fastening or securing the drawbar to the hitch arms and thus providing, in effect, a frame, shown generally at 42, in which said hitch arms and transverse drawbar constitute three sides while the axle housing provides a fourth side therefor. Now, it will be appreciated, any lateral movement or sway of the frame 42 will cause said frame to pivot about the ball and socket joints 18, 20 and 19, 21 which secure the frame at one end thereof to the axle housing, and about the pivot fastening pins 40, 41 disposed at the other or rearward end of the frame. Each end of the transverse drawbar 36 may be formed with an angularly extending enlarged wing-like portion such as 43, 44, and the forwardly extending end of each such portion may be provided with apertures alignable with similar apertures 45, 46 in the respective hitch arms and which apertures are adaptable to respectively receive removable interlocking pins such as 47, 48. When said forwardly disposed apertures in the wings of the drawbar and the associated apertures in the respective hitch arms have been aligned the interlocking pins 47, 48 are insertable for stabilizing the frame 42 and making it rigid for resisting lateral thrust or side sway. Storage holes such as 49, 50 in the respective hitch arms may accommodate the interlocking pins when not in use. Since the hitch arms will be interlocked with the transverse drawbar member, at four points across the corners thereof, when said interlocking pins are in place, it will be appreciated that a very rigid structure has been provided, and as thus interlocked the structure will not permit lateral movement or side sway despite the fact the forward end thereof is universally mounted to the vehicle frame. Likewise when said hitch frame is raised or lowered by vertical pivoting about the ball and socket joints 18, 20 and 19, 21, as a result of motivation by either one of the separate hydraulic ram lift means 28, 29, the frame will move as a relatively rigid unit without twisting or distorting so that both arms thereof will move through substantially identical distances simultaneously. This is particularly desirable because of the fact that the hydraulic rams are not mechanically operatively interconnected by the conventional rockshaft, which, when employed, would ordinarily serve to make these units operate together for moving both arms of the hitch uniformly. Now any slight variation in the operation of the separate hydraulic lift means, because of pressure differences or dimensional inaccuracies or the like, will not cause one arm of the hitch to move a different vertical distance than the other arm, but instead, because of the proposed unique construction of the frame, the arms thereof will move uniformly without tilting or twisting.

An additional means for limiting lateral movement or side sway of the hitch mechanism, and which is particularly useful when the implement is carried in the transport position, although not limited to use in such position, is provided by the cam plate member 51 (FIG. 4) functioning in cooperation with the arms of the hitch frame. This plate, which is vertically disposed and suitably affixed, as by welding or the like, to the vehicle frame, is fashioned with a pair of spaced-apart downwardly extending and oppositely directed arm-like portions 52 and 53 with the outer edge surface of each thereof curved to provide a camming surface such as 54 and 55. The plate 51 is laterally dimensioned so that when the hitch mechanism is raised, such as to transport position, said plate will fit snugly in contact or engagement with projecting abutments 56 and 57 formed on the respective hitch arms thereby preventing lateral movement or side sway of the hitch frame. On occasion, however, it is desirable to operate the hitch mechanism without the removable interlocking pins 47 and 48 in position so as to permit a limited lateral amount of movement or side sway for certain operations thereof. In order to prevent extreme movements or excessive sway under such conditions the mechanism is arranged so that when the hitch rises slightly the cammed surfaces 54 and 55 will engage the abutments 56 and 57 on the respective hitch arms, and hence, it will be appreciated, that lateral or side sway movement of the hitch mechanism while permitted in certain positions thereof will be controlled and maintained within acceptable limits.

The vertical inside faces of the connecting webs 22c, 23c of the hitch arms 22, 23 form abutting surfaces 58, 59, disposed at the bend of said arms, which may serve as limit stops or bumpers for engaging contact with the respective outside vertical edges 60, 61 of the wing portions of the transverse drawbar member 36, thereby providing means for limiting lateral movement or side sway when the hitch frame is operated under conditions that permit a limited amount of side sway, such as when locking pins 47, 48 have been removed and the hitch arms are being operated at an elevation such that they do not engage the cam plate surfaces 54 and 55 upon lateral sway. This stop or bumper arrangement may be considered as part of the overall means that cooperates with the interlocking pins to selectively permit limited sway or to completely restrict side sway of the hitch frame unit when the cammed-plate member means 51 is not operative for sway control purposes.

The outboard or rearward flaired end portions 34, 35 of the hitch arms 22, 23 have bearing sleeves 62, 63 positioned in apertures 64, 65 therein that journal intermediate float links or extension members 66, 67, and large-headed bolts 68, 69 together with retaining washers 68a, 69a and threaded nuts 68b, 69b therefor cooperate to retain said float links against lateral displacement, while simultaneously permitting rotation thereof relative to the respective hitch arms. The rearward ends of each of said intermediate or float links, in turn, are pivotally connected, by ball and socket pivotal connections such as 70, 71, to opposite ends of a rigid yoke or wishbone-like assembly, indicated generally at 72. Said yoke, which may be fashioned to resemble the letter A in configuration, includes a central curved or flat-arched portion 73 interconnecting oppositely positioned end plate members 74 and 75 to which the respective intermediate or float link members are pivotally connected. Medially of the ends of the arched portion 73 is a pin-hook bracket 76 that is fixedly secured, by any suitable means such as welding or the like, to the said arched portion for movement therewith. This bracket includes an open jaw hook 77, for receiving one of the pin connecting members (not shown) of the attached implement, and a pair of spaced-apart arms 76a and 76b for supportably receiving the opposite ends of a mounting pin 78 forming part of a ball and socket connecting means 79. Said ball and socket connection serves to connect said bracket with one end of a threaded rod 80 forming part of an adjustable turnbuckle device 81, and the opposite end of said turnbuckle is connected by a threaded rod 82 and a ball and socket connecting means 83 to a support bracket 84 suitably affixed to the tractor frame 10. A plurality of vertically spaced openings 85 in said support bracket may be provided to permit repositioning of the ball and socket connection 83 therewithin, as desired, to accommodate different mounting positions for said turnbuckle link member.

Each of the end plate members 74, 75 are fashioned with a hook or jaw portion 86, 87 extending rearwardly therefrom that is adapted to receive a pin connecting member (not shown) usually forming part of the groundworking implement to be attached thereto. Latch members 88, 89 pivotally mounted at 88a, 89a on said plates are disposed so that they may be rotated into position to close the opening of the respective jaws 86, 87 and thus prevent accidental displacement of the implement-connecting pin therefrom. A pair of openings such as shown at 88b, 89b in said latch members are each alignable with openings in the associated yoke end plates for receiving removable pins 88c, 89c to fixedly position each of said latches in an open or closed position relative to the respective jaw.

The outer vertical bearing faces 90, 91 of the rearwardly extending flaired end portions of the respective hitch arms 22, 23 are provided with triangular-shaped cut-away recess areas 90R, 91R (FIGS. 5 and 6) extending upwardly and inwardly from the lower outer edge thereof which, together with portions of the lower surface of the respective hitch arms, provide abutment means adapted to engagingly receive and contact complementally arranged projecting members on the intermediate links as will now be further explained. As viewed in FIGURES 9–11 it will be seen that each of the intermediate link members 66 and 67 are fashioned so that each one of the respective vertical bearing surfaces 92o, 93o (the outboard surface as shown herein) is provided with a pair of irregularly-shaped raised lugs or projections such as shown at 92FO, 92RO and 93FO, 93RO, while the opposite vertical faces 94I, 95I (the inboard as shown herein) of said members are respectively provided each with a pair of generally rectangular-shaped raised lugs or projections 94FI, 94RI and 95FI, 95RI which latter projections are slightly smaller in vertical dimension than the former. Each such projection has an upper abutting surface such as the ones designated 92FOU, 93FOU on the forward outboard projections 92FO, 93FO; 92ROU, 93ROU on the rearward outboard projections 92RO, 93RO; 94FIU, 95FIU on the forward inboard projections 94FI, 95FI; and 94RIU, 95RIU, on the rearward inboard projections 94RI, 95RI, while the cutaway areas 90R, 91R have downwardly facing upper surfaces 90RU, 91RU and the underneath portion of the respective hitch arms have similar downwardly facing surfaces 22FU, 23FU. These latter downwardly facing surfaces are adapted to engage said cooperating upper surfaces of the respective projections on the intermediate links to provide limiting or stop means for, either limiting rotational movement of the intermediate links relative to the respective hitch arms, or for interlocking and preventing any rotative movement between said respective members, all depending on the relative or juxtaposed positions thereof. However, in order to accomplish the interlock or sway movement-preventing action there must be a change made from the condition depicted in the attached drawings. As shown, the inboard face 94I of the right-hand intermediate link 66, is in abutting relation with the vertical face 90, of the interconnected hitch arm 22, and the rectangular projection 94RI is fitted into the complemental cutaway area 90R in said hitch arm and the projection 94FI is positioned for engagement with the underneath portion 22FU of the hitch arm, while the opposite or left-hand link 67 is similarly disposed relative to its associated projections and the engaging surfaces therefor. Now when the links 66, 67 are rotated clockwise about pivots 68, 69 they will be permitted to rotate until the upper surfaces 94RIU, 95RIU of projections 94RI, 95RI contactingly engage the downwardly facing upper surfaces 90RU, 91RU of recesses 90R, 91R whereupon movement of the links relative to the interconnected hitch arms is stopped. In similar manner when float links 66, 67 are rotated counterclockwise about pivots 68, 69 rotation continues until the upper surfaces 94FIU, 95FIU of projections 94FI, 95FI contactingly engage the downwardly facing surfaces 22FU, 23FU on the underneath portions of the respective interconnected hitch arms, whereupon movement of said links relative to said respective hitch arms is stopped. As thus arranged a float feature is provided which permits a limited amount of vertical movement of the intermediate links and attached yoke member 72 together with the connections of an attached implement relative to the hitch arms and the vehicle, without operation of the associated hydraulic lift means. Such flexibility is particularly useful to accommodate and allow for any lateral misalignment of the yoke assembly and its attached implement with the tractor and the lower link hitch arms of the mechanism.

Now in order to eliminate or lock out the float feature and cause the intermediate links to move as rigid extensions of the interconnected hitch arms it is only necessary to interchange the right and left-hand intermediate link members so as to change the juxtaposition thereof relative to the respective hitch arms. This may be done simply by removing the pivot connections 70, 71 and the pin bolt connections 68, 69 and then putting the right link 66 where the left link 67 was, replacing the right link 66 with the left link 67, and then putting said pivotal connections back in place. As thus arranged the upper surfaces of the irregular-shaped projections are now positioned to engage the cooperating abutment surfaces on the respective hitch arms and there will be no movement therebetween. For instance, upper surface 92ROU of projection 92RO will engage the downwardly facing upper surface 91RU of the cutaway recess 91R, while the upper surface 92FOU of projection 92FO engages the downwardly facing surface 23FU on the underneath portion of the respective hitch arm 23, and incident thereto the respective surfaces of the projections on the other designated link similarly cooperatively engage their cooperating abutting surfaces and, since all these surfaces are disposed for close fitting engagement, no rotative movement will be permitted between the intermediate links and the respective interconnected hitch arms. In this manner, it will be appreciated that the intermediate links are made selectively positionable so as to move with the respective hitch arms as extensions thereof, or they may be independently pivotable within controlled limits in a vertical plane relative to the respective hitch arms, thereby providing the hitch mechanism with a highly desired degree of flexibility.

Figure 5:
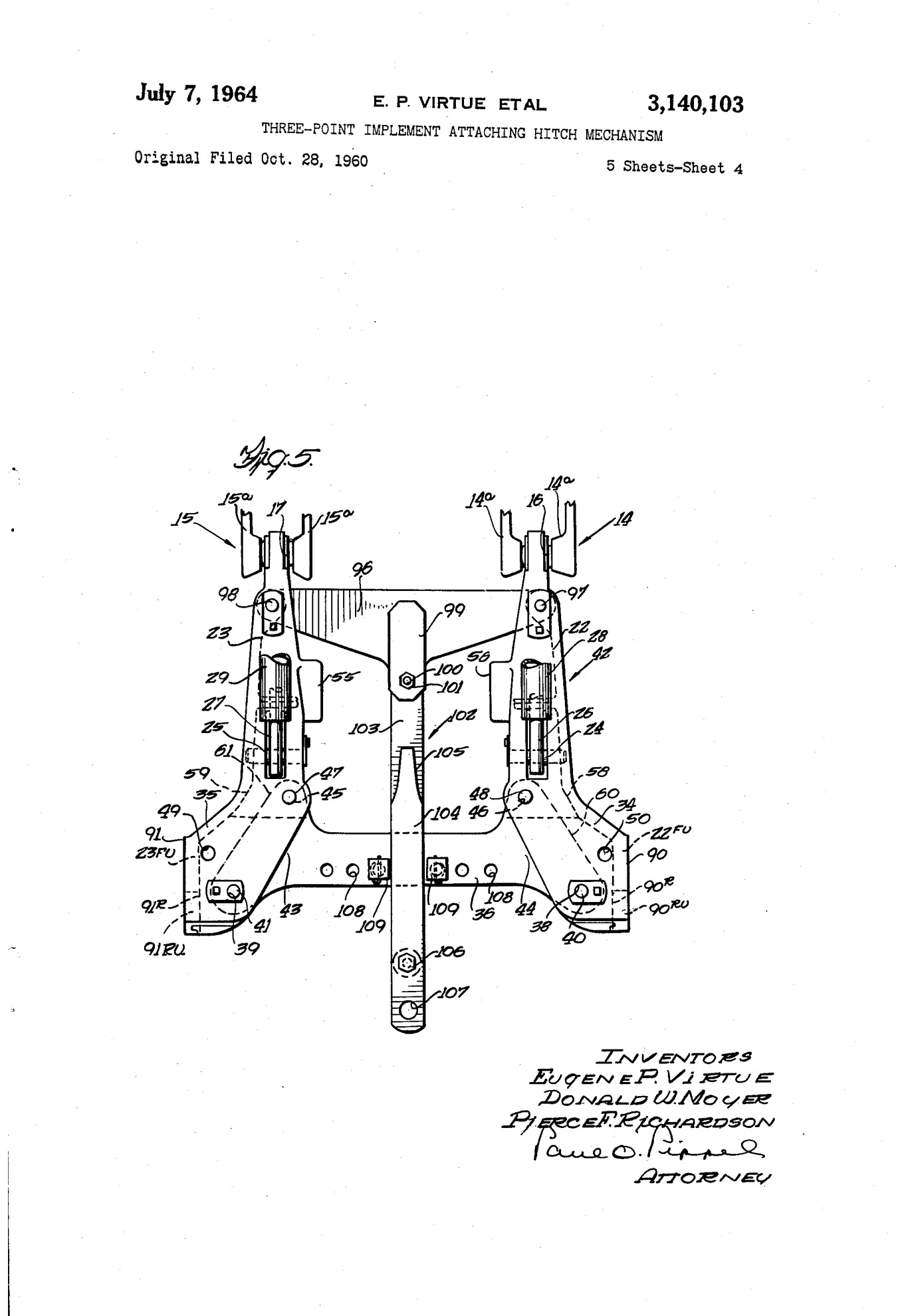

Referring now to FIGURES 3, 4, and 5, it will be seen that a transversely extending plate-like beam support member 96, generally triangular in shape, is supportably carried at opposite ends thereof by a forward portion of each of the hitch arms 22 and 23. Pin means 97 and 98 positioned through aligned apertures in said support beam and through the upper and lower arms of a respective hitch arm serve to fixedly secure the beam for movement with said hitch arms. Disposed medially of the sides and adjacent the rearward edge of said beam is a bracket 99 suitably affixed to and for movement with the beam 96, and pivotally mounted within an opening of said bracket, by suitable means such as the removable bolt 100 and nut 101, is one end of a tongue-like towbar or longitudinal drawbar member, indicated generally at 102, which extends rearwardly therefrom and is adapted for swingable horizontal movement in either direction about said pivot bolt. The towbar member 102 may be fashioned to include a lower relatively flat longitudinal bar member 103 which is pivoted at its forward end on the pivot bolt 100, and an upper bar member 104 suitably securely affixed to said lower bar in the vicinity of the forward end thereof. An upwardly extending offset portion 105 in said upper bar is dimensioned to permit straddling or bracketing the transverse drawbar 36 with the upper and lower portions of said towbar as best seen in FIGURE 3. A bolt and nut 106 may be provided as indicated to keep said upper and lower portions of the towbar from separating or spreading as a result of loading other than direct tensional forces thereon. Aligned apertures 107 in the upper and lower portions of said towbar or longitudinal drawbar are provided to receive a removable pin (not shown) upon which the apparatus to be towed may be suitably fastened as is well understood. A plurality of spaced openings 108 in the transverse drawbar 36 are adapted to receive removable pins, such as 109, that are positionable for fixedly positioning the longitudinal drawbar 102 against side displacement in any one of a plurality of different positions as desired. With the arrangement thus provided said longitudinal drawbar or towbar is mounted for horizontal swingable movement about the pivot 100 and, additionally, is rotatable in a vertical plane with the hitch frame about the axle supporting pivotal connections 16 and 17.

It should now be apparent that a novel implement-attaching hitch mechanism has been shown and described, and it is to be understood that changes may be made in the construction without departing from the spirit of the invention or the scope thereof as defined in the appended claims.

What is claimed is:

1. In a hitch mechanism for supportably and detachably fastening an earth-working implement to a tractor, the combination, comprising: a pair of generally fore-and-aft extending laterally spaced-apart draft links mounted at the forward ends thereof on a rear portion of the tractor for lateral and vertical swinging; means including a transverse drawbar interconnecting the rearward ends of said draft links and being connectable for selectively permitting limited lateral swinging of said draft links or for restraining the lateral swinging thereof relative to the tractor to which they are attached; means including a transversely extending support pivotally connected at opposite ends thereof to the forward portions of said draft links and constrained for lateral and vertical movement with said draft links; longitudinally extending towbar means disposed between said draft links; said towbar means having the forward end thereof pivotally mounted on said transverse support and having the rearward end thereof adapted for connection to an attached implement; and laterally displaceable adjustable means on said transverse drawbar engageable with said towbar means for limiting the lateral swinging of said towbar means about the pivotal mounting thereof on said transversely extending support.

2. In a hitch mechanism for supportably and detachably fastening an earth-working implement to a tractor, the combination, comprising: a pair of generally fore-and-aft extending laterally spaced-apart draft links mounted at the forward ends thereof on a rear portion of the tractor for lateral and vertical swinging; means including a transverse drawbar interconnecting the rearward ends of said draft links and being connectable for selectively permitting limited lateral swinging of said draft links or for restraining the lateral swinging thereof relative to the tractor to which they are attached; means including a transversely extending support pivotally connected at opposite ends thereof to the forward portions of said draft links and constrained for lateral and vertical movement with said draft links; longitudinally extending towbar means disposed between said draft links; said towbar means including a member having the forward end thereof pivotally carried by said transverse support, and having the rearward portion thereof bifurcated and disposed to straddle said transverse drawbar and extend rearwardly therebeyond, and further having said rearward bifurcated end portion adapted for connection to an attached implement; and laterally displaceable adjustment means carried by said transverse drawbar and positionable on either side of said towbar means for abutting engagement therewith so as to selectively limit the lateral swinging of said towbar means or to fixedly displace the rearward end portion thereof relative to said draft links.

3. The structure described in claim 2 but further characterized in that the transversely extending support is pivotably connected at opposite ends thereof to the draft links by pivots laterally spaced-apart and disposed on axes extending normal to the longitudinal axis of said support and to the longitudinal axes of said draft links.

4. The structure defined in claim 3 and further characterized by having the forward end of said towbar pivotally carried by the transversely extending support on an axis that extends normal to the longitudinal axis of said transversely extending support.

5. In a hitch mechanism for supportably and detachably fastening an earth-working implement to a tractor, the combination, comprising: a pair of generally fore-and-aft extending laterally spaced-apart draft links mounted at the forward end thereof on a rear portion of the tractor for lateral and vertical swinging; a rigid transversely extending drawbar member connected by vertically disposed pivots at opposite ends thereof to a respective draft link and arranged so as to accommodate lateral swinging of said links about the forward mounting means on the tractor; vertically disposed removable pin means positionable forwardly of the pivotal connections of said transverse drawbar member with said draft links for interlockingly connecting said transverse drawbar member to each of said draft links and being cooperative with said vertically disposed pivots of the transverse drawbar member for constraining said draft links against lateral swingable movement; means including a transversely extending support connected by vertically disposed pivots at opposite ends of said support to the forward portions of said draft links and constrained for lateral and vertical movement with said draft links; a fore-and-aft extending towbar disposed medially between said draft links and extending substantially parallel therewith; said towbar having a forward end thereof pivotally mounted on said transverse support for lateral swinging movement relative thereto and having a rearward end thereof adapted for connection to an attached implement; and laterally displaceable adjustable means on said transversely extending drawbar member engageable with said towbar for limiting the lateral swinging of said towbar about the pivotal mounting thereof on said transversely extending support.

6. In a hitch mechanism for supportably and detachably fastening an earth-working implement to a tractor, the combination, comprising: a pair of generally fore-and-aft extending laterally spaced-apart draft links mounted at the forward end thereof on a rear portion of the tractor for lateral and vertical swinging; a rigid transversely extending drawbar member connected by vertically disposed pivots at opposite ends thereof to a respective draft link and arranged so as to accommodate lateral swinging of said links about the forward mounting means on the tractor; vertically disposed removable pin means positionable in an area spaced from the pivotal connections of said transverse drawbar member with said draft links for interlockingly connecting said transverse drawbar member to each of said draft links and being cooperative with said vertically disposed pivots of the transverse drawbar member for constraining said draft links against lateral swingable movement; means including a transversely extending support connected by vertically disposed pivots at opposite ends of said support to the forward portions of said draft links and constrained for lateral and vertical movement with said draft links; a fore-and-aft extending towbar disposed medially between said draft links and extending substantially parallel therewith; said towbar having a forward end thereof pivotally mounted on said transverse support for lateral swinging movement relative thereto and having a rearward end thereof adapted for connection to an attached implement; and laterally displaceable adjustable means on said transversely extending drawbar member engageable with said towbar for limiting the lateral swinging of said towbar about the pivotal mounting thereof on said transversely extending support.

7. In a hitch mechanism for supportably and detachably fastening an earth-working implement to a tractor, the combination, comprising: a pair of generally fore-and-aft extending laterally spaced-apart draft links mounted at the forward end thereof on a rear portion of the tractor for lateral and vertical swinging and having outwardly flared rear sections; a rigid transversely extending drawbar member having angularly extending wing-like ends and connected by vertically disposed pivots at opposite ends thereof to respective rear sections of said draft links and arranged so as to accommodate lateral swinging of said links about the forward mounting means on the tractor; vertically disposed removable pin means positionable forwardly and inwardly of the pivotal connections of said transverse drawbar member with said draft links for interlockingly connecting said transverse drawbar member to each of said draft links and being cooperative with said vertically disposed pivots of the transverse drawbar member for constraining said draft links against lateral swingable movement; means including a transversely extending support connected by vertically disposed pivots at opposite ends of said support to the forward portions of said draft links and constrained for lateral and vertical movement with said draft links; a fore-and-aft extending towbar disposed medially between said draft links and extending substantially parallel therewith; said towbar having a forward end thereof pivotally mounted on said transverse support for lateral swinging movement relative thereto and having a rearward end thereof adapted for connection to an attached implement; and laterally displaceable adjustable means on said transversely extending drawbar member engageable with said towbar for limiting the lateral swinging of said towbar about the pivotal mounting thereof on said transversely extending support.

References Cited in the file of this patent
UNITED STATES PATENTS

| | | |
|---|---|---|
| 1,654,417 | Foley | Dec. 27, 1927 |
| 2,534,109 | De Witt | Dec. 12, 1950 |
| 2,698,564 | Sawyer | Jan. 4, 1955 |